(12) United States Patent
Hahn et al.

(10) Patent No.: US 8,044,779 B2
(45) Date of Patent: Oct. 25, 2011

(54) METHOD AND DEVICE FOR ASSISTING A DRIVER WHEN MANEUVERING A VEHICLE OR VEHICLE-TRAILER COMBINATION

(75) Inventors: Stefan Hahn, Ulm (DE); Tobias Ehlgen, Tuebingen (DE); Markus Glaser, Stuttgart-Botnang (DE); Thomas Ruland, Tettnang (DE)

(73) Assignee: Daimler AG, Stuttgart (DE)

( * ) Notice: Subject to any disclaimer, the term of this patent is extended or adjusted under 35 U.S.C. 154(b) by 386 days.

(21) Appl. No.: 12/444,148

(22) PCT Filed: Aug. 25, 2008

(86) PCT No.: PCT/EP2008/006948
§ 371 (c)(1),
(2), (4) Date: Apr. 2, 2009

(87) PCT Pub. No.: WO2009/027067
PCT Pub. Date: Mar. 5, 2009

(65) Prior Publication Data
US 2010/0007478 A1 Jan. 14, 2010

(30) Foreign Application Priority Data
Aug. 27, 2007 (DE) .......................... 10 2007 040 250

(51) Int. Cl.
*G08B 21/00* (2006.01)
(52) U.S. Cl. ..................... 340/431; 340/425.5; 340/436; 340/438
(58) Field of Classification Search .................. 340/431, 340/425.5, 435, 436, 438, 437, 440, 463, 340/465
See application file for complete search history.

(56) References Cited

U.S. PATENT DOCUMENTS

| | | | | |
|---|---|---|---|---|
| 4,952,908 A | * | 8/1990 | Sanner | 340/429 |
| 6,411,867 B1 | * | 6/2002 | Sakiyama et al. | 340/901 |
| 6,693,524 B1 | * | 2/2004 | Payne | 340/463 |
| 7,295,227 B1 | * | 11/2007 | Asahi et al. | 348/118 |
| 2006/0244579 A1 | | 11/2006 | Raab | |

FOREIGN PATENT DOCUMENTS

| | | |
|---|---|---|
| DE | 102005051804 A1 | 5/2007 |
| WO | 2004109326 A1 | 12/2004 |

* cited by examiner

*Primary Examiner* — Eric M Blount
(74) *Attorney, Agent, or Firm* — Patent Central LLC; Stephan A. Pendorf

(57) ABSTRACT

The invention relates to a method and a device for assisting a driver when maneuvering a vehicle or vehicle-trailer combination (1) which has vehicle elements (2, 3) which can move with respect to one another. The method provides that the vehicle or vehicle-trailer combination is/are displayed in the straight-ahead position on a display unit (A) using a static display element (4) which corresponds to the straight-ahead position of the vehicle elements (2, 3) and in addition respectively using a dynamic display element (6, 7) which is assigned to the respective vehicle element (2, 3) and is determined as a function of an instantaneous or future position of the vehicle elements (2, 3) which can move with respect to one another. In this context, the dynamic display elements (6, 7) are displayed enhanced multiply and highlighted in terms of color.

12 Claims, 1 Drawing Sheet

Figure 1:
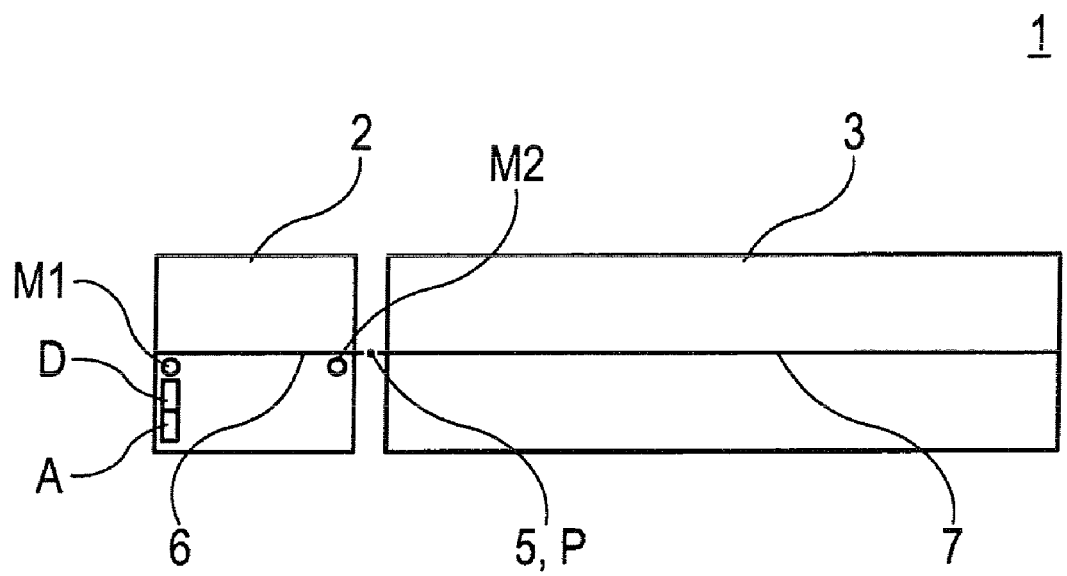

METHOD AND DEVICE FOR ASSISTING A DRIVER WHEN MANEUVERING A VEHICLE OR VEHICLE-TRAILER COMBINATION

The invention relates to a method and a device for assisting a driver when maneuvering a vehicle or vehicle-trailer combination which has a plurality of vehicle elements which can move with respect to one another.

Various methods and devices for assisting a driver when maneuvering vehicles or vehicle-trailer combinations, in particular utility vehicles, are known from the prior art.

Therefore, for example reversing in a straight line proves difficult with vehicles or vehicle-trailer combinations which have vehicle elements which can move with respect to one another. This is due to steering movements since a very small steering movement results in a trailer or semitrailer veering away.

DE 100 65 230 A1 discloses a method and a device for facilitating the maneuvering and/or reverse travel of a vehicle or vehicle-trailer combination, wherein the vehicle with a trailer is displayed from a bird's eye view in a schematic illustration on a display unit. In this context, the device comprises a steering angle measuring apparatus which senses the steering angle of the steerable axle of the vehicle, and a monitoring device, in particular parking assistance device, which senses at least the direct vicinity of the vehicle facing the trailer.

The invention is based on the object of specifying an improved method for assisting a driver and a device for carrying out the method as a maneuvering aid for a driver of a vehicle or vehicle-trailer combination which has vehicle elements which can move with respect to one another.

The object is achieved according to the invention by means of a method and a device for carrying out the method having the features specified in claims 1 and 8. Advantageous developments of the invention are the subject matter of the subclaims.

The method according to the invention displays a vehicle or vehicle-trailer combination schematically and, for example, in a straight-ahead position on a display unit in said vehicle or vehicle-trailer combination, for example a utility vehicle with vehicle elements which can move with respect to one another. In this context, a static display element, for example a line, which represents the straight-ahead position of the vehicle elements, is output and displayed in a superimposed fashion in the image which displays, for example, the outlines of the vehicle or vehicle-trailer combination. According to the invention, a dynamic display element is assigned to each displayed vehicle element as a visual maneuvering aid for, for example, reversing, in particular for reversing in a straight line or cornering in reverse, as a function of a position of the vehicle elements of the vehicle or vehicle-trailer combination which is being driven, said dynamic display element being in addition output and displayed in particular in a way which is visually superimposed on the outlines of the vehicle elements and the static display element. In this context, the static display element expediently runs in the longitudinal direction of the vehicle or vehicle-trailer combination, along the central axis.

The dynamic display elements of the respective, displayed vehicle elements are connected to a center of rotation of a connection of the vehicle elements, for example to a joint or to a trailer device, and when one of the vehicle elements swivels they are correspondingly swiveled about this center of rotation. In this context, the dynamic display elements represent the profile of the central axis when vehicle elements are bent with respect to one another, and therefore represent said profile as a function of instantaneously set steering angles and/or bending angles, and are output, for example, as a further line with a different suitable type of line and/or size of line and/or shape of line.

In other words: the dynamic display elements are used to display an instantaneous position and/or of future change in the position of the individual vehicle elements which are bent or swiveled with respect to one another. In this context, the vehicle or the vehicle-trailer combination is always displayed in a straight-ahead position of all the vehicle elements in the image of the display unit by means of the output static display elements, and in an instantaneous and/or future swiveled position of the vehicle elements, which can be expected owing to a steering movement, by means of the dynamic display elements which are output. The dynamic display elements are superimposed here on the static display element which represents the straight central axis of all the vehicle elements. This representation permits the driver of a vehicle to identify and assess a driving profile, in particular maneuvering, on the basis of the dynamic display elements and the static display element which are displayed on the screen, and to implement corresponding measures for changing the driving profile, in particular a cornering profile which has been adopted.

The illustration of the vehicle or vehicle-trailer combination which is shown in the straight-ahead position is expediently displayed on a suitable scale.

In a further embodiment, the dynamic display elements are preferably adapted on the basis of a sensed instantaneous steering angle and/or bending angle and output and displayed in a correspondingly changed form. For this purpose, the steering angle and/or the bending angle are continuously sensed. An up-to-date display of the position of the vehicle elements on the basis of the dynamic display elements is therefore ensured by taking into account the latest steering angle and/or the latest bending angle in the determination of the dynamic display elements which represent the pivoting of the vehicle elements. This is particularly advantageous for simple and rapid monitoring of short maneuvering distances such as, for example, maneuvering in reverse, during which small changes in steering cause individual vehicle elements to correspondingly veer away or swivel.

Furthermore, the method provides for the currently sensed values of the steering angle and/or of the bending angle to be fed to an evaluation unit and taken into account there in the determination of the dynamic display elements. The dynamic display elements which are determined as a function of the instantaneous steering angle and/or bending angle are subsequently fed to a display unit. The display unit is used to display to the driver of the vehicle the dynamic display elements, superimposed on a static display element, on a screen which can be viewed during driving. This superimposed representation permits the change in the position of the vehicle elements to be displayed easily and in a way which can be readily perceived, said display displaying to the driver the initial position (=straight-ahead position of all the vehicle elements) and an instantaneous position which deviates from this one which has been assumed or a future, bent position of the vehicle elements.

The dynamic display elements are output and displayed highlighted, in particular with respect to the outlines of the vehicle elements and/or the static display element, for rapid and reliable detection of deviations of the position of the vehicle elements owing to, in particular, very small steering movements, which results in a deflection of the trailer or semitrailer in the course of driving. In one possible embodiment, the dynamic display elements can be output and displayed in an enhanced form, for example as enhanced solid lines with a relatively large width and/or highlighted in terms of color. In this context, different selections can be made for the enlarged and/or colored representation of the display elements for the respective vehicle elements.

The device for carrying out the method is embodied in such a way that a display unit is provided on which a static display element which represents the straight-ahead position of the vehicle elements and in addition at least one dynamic display element which is assigned to the respective vehicle element can be output in such a way that said dynamic display element is superimposed on said static display element, as a function of a position of the vehicle elements of the vehicle or vehicle-trailer combination which is being driven.

In this context, the device comprises a measuring unit for sensing the steering angle of at least one steerable axle, a measuring unit for sensing the bending angle of the vehicle elements which can move with respect to one another, an evaluation unit and the display unit. The currently sensed values of the steering angle and/or the currently sensed values of the bending angle are fed to the evaluation unit for processing and determining of the display of the static display elements and of the dynamic display element. The dynamic display elements are displayed on the display unit in a superimposed and highlighted fashion and they assist the driver of the vehicle when he is maneuvering, in particular reversing.

The measuring unit for sensing the steering angle, expediently for sensing very small steering movements, and the measuring unit for sensing the bending angle, are preferably embodied as position sensors, in particular angle sensors in the form of magneto-resistive angle sensors or Hall sensors.

The evaluation unit is used to process the sensed values of the steering angle and of the bending angle. On the basis of the sensed instantaneous steering angle of at least one steerable axle and/or the sensed instantaneous bending angle of vehicle elements which can move with respect to one another, the evaluation unit determines, in addition to the predefined or determined static display element, dynamic display elements which represents a deflection of at least one of the vehicle elements which can move with respect to one another.

For example a display unit which is arranged in the region of the dashboard, for example a screen or what is referred to as a head-up display, is suitable as a display unit. In the case of the head-up display, the image data which are to be displayed are projected onto faces which are present in the vehicle or vehicle-trailer combination, in particular the windshield. Such an arrangement of the display unit provides the advantage that the images are displayed at locations which can generally be viewed by the driver of the vehicle while he is driving or maneuvering.

Figure 2:
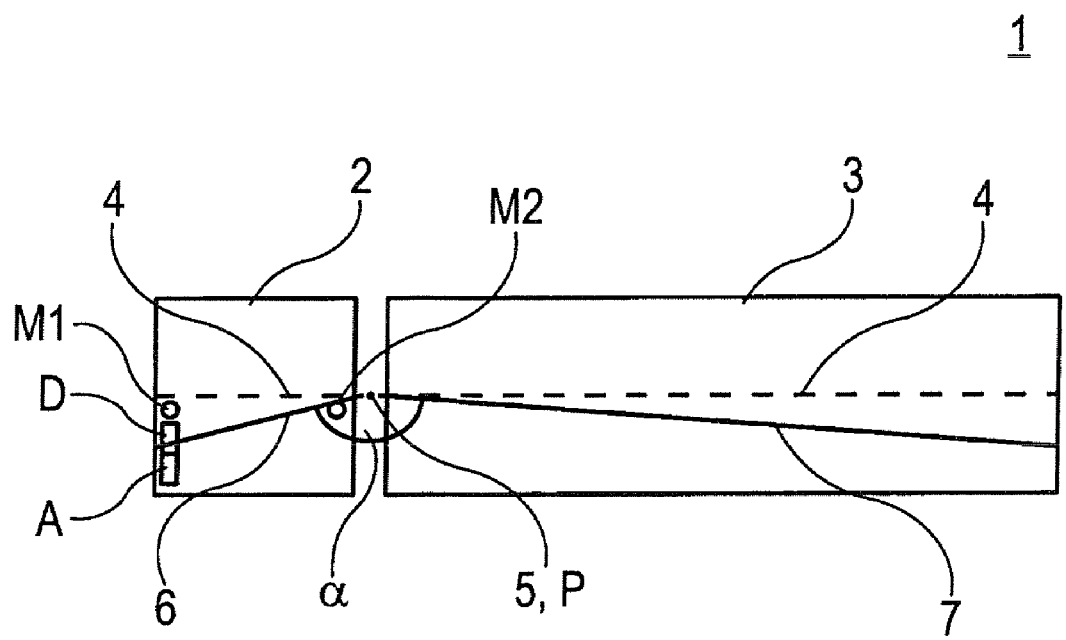

Exemplary embodiments will be explained in more detail on the basis of drawings, in which:

FIG. 1 is a schematic illustration of a vehicle or vehicle-trailer combination having a static display element which runs in the longitudinal direction of the vehicle or vehicle-trailer combination and corresponds to the central axis, and FIG. 2 shows a further schematic illustration of a vehicle in a straight-ahead position with dynamic display elements.

Parts which respond to one another are provided with the same reference symbols in all the figures.

FIG. 1 shows a possible image which is output schematically on a display unit A, with a vehicle or vehicle-trailer combination 1 (referred to below for short as vehicle 1) which is illustrated, for example, in the form of outlines. The image shows the vehicle 1 with a straight-ahead position of vehicles elements 2, 3 which can bend with respect to one another.

In order to indicate the straight-ahead position of all the vehicle elements 2, 3 of vehicle 1, a static display element 4, for example as illustrated a dashed line, is output and displayed superimposed on the outlines of the vehicle 1 in the image which is output. The static display element 4, for example a dashed line, preferably runs in the longitudinal extent of the displayed vehicle 1 along its central axis.

The vehicle element 2 is connected to the vehicle element 3 by, for example, a flexible connection 5, for example a joint or a trailer device. The vehicle element 2 is, for example, a semitrailer tractor, and the vehicle 3 a semitrailer. The vehicle elements 2, 3 are mounted such that they can move with respect to one another here, in particular about a center of rotation. However, displacements or deflections in the lateral direction and/or longitudinal direction are also possible as a function of the respective connection.

The display unit A is arranged in the vehicle element 2 which is, for example, the semitrailer tractor of a vehicle 1, at a suitable position, in particular a position which can be viewed by the driver. The images which are displayed, for example, in FIGS. 1 and 2 are output on the display unit A. The images which are output are expediently output without the display unit A and/or the evaluation unit D which is described below and/or measuring units M1, M2 being displayed. That is to say only the vehicle outlines and the static and dynamic display elements 4, 6 and 7 are displayed on the images.

Furthermore, at least a first measuring unit M, which is embodied in particular as a position sensor, for example, an angle sensor in the form of a magneto-resistive angle sensor or Hall sensor, is provided for sensing a steering angle (not illustrated in more detail) on at least one steerable axle. This steering angle results from a steering movement which is executed by the semitrailer tractor. This steering movement is then transmitted via the flexible connection 5 of the vehicle elements 2, 3 to the vehicle element 3 during the course of driving. This changing of the angle between the vehicle elements 2, 3 is sensed as a bending angle $\alpha$ by a further measuring unit M2. This measuring unit M2 is embodied as a position sensor, in particular an angle sensor in the form of a magneto-resistive angle sensor or Hall sensor.

If the steering angle measured by the first measuring unit M1 is zero, the wheels of at least the steerable axle are parallel to the central axis and therefore to the displayed, static display element 4 which corresponds to the central axis. In addition, one or more associated dynamic display elements 6, 7, which display possible swiveling of one or both vehicle elements 2, 3, as is illustrated by way of example in FIG. 2 by means of the solid lines, are determined for each vehicle element 2, 3 by means of the evaluation unit A on the basis of the values of the measuring units M1 and M2.

Depending on the prespecification, the dynamic display elements 6 and 7 (for example solid lines) of the vehicle elements 2 and 3 are displayed highlighted with respect to the outlines of the vehicle 1 which are output and the static display element 4 which is output, in the image on the display unit A. For example, the dynamic display elements 6, 7 are output with a relatively large line width, with a different type of line, for example as solid lines, and/or highlighted in terms of color, for example red, compared to the static display element 4. In FIG. 1 with the straight-ahead position of all the vehicle elements 2, 3, the dynamic display elements 6, 7 run in a way which is analogous to the static display element 4 and therefore parallel to the central axis.

In order to display pivoting or deflection of the vehicle elements 2, 3 which can move with respect to one another, the dynamic display elements 6, 7 can swivel about a center of rotation P which corresponds to the connection 5 between the vehicle elements 2, 3. If at least one of the vehicle elements 2 and 3 or both are deflected owing to a change in the sensed steering angle, during the further course of driving the steering angle is transmitted via the connection 5 to one of the vehicle elements 2 or 3 or to both, as a result of which the respective vehicle element 2 or 3 is deflected by a corresponding bending angle α. In order to indicate the swiveling out of one or of all the vehicle elements 2, 3, the associated display elements 6 and 7 are output swiveled about the center of rotation P in the representation in the figure. In FIG. 1, the bending angle α is zero. In FIG. 2, both vehicle elements 2 and 3 are pivoted out with a corresponding bending angle α owing to a locked steering angle. This swiveling out is output and displayed by the dynamic display elements 6, 7 which are swiveled in accordance with the set steering angle and/or the sensed instantaneous bending angle α about the center of rotation P which represents the connection 5.

While the vehicle 1 is operating, both the steering angle and the bending angle α are continuously sensed by means of the measuring unit M1 and M2 when a driver of the vehicle 1 executes a steering movement, and they are fed to an evaluation unit D, which may be, for example, an integral component of the display unit A or of some other suitable control unit. On the one hand, the static display element 4, which is based on the respective type of vehicle, is determined by means of the evaluation unit D. On the other hand, the outlines on which the respective type of vehicle is based, are determined. As is shown in FIG. 1 for a straight-ahead position of the vehicle 1, the outlines of the vehicle 1 and the static display element 4 are subsequently output in graphic form. In order to determine the position or a change in the position of the vehicle elements 2, 3 owing to a change in the steering angle and/or bending angle α during driving or during maneuvering of the vehicle 1, measured values are continuously acquired by means of the measuring units M1 and M2. These measured values are fed to the evaluation unit D. Said evaluation unit D then determines both the static display element 4 and the dynamic display elements 6 and 7 and generates corresponding signals for displaying them on the display unit A.

So that the driver can easily, quickly and reliably identify a change in the position of the vehicle elements 2 and 3, the dynamic display elements 6, 7 are output graphically highlighted with respect to the static display element 4. For example the dynamic display elements 6, 7 are therefore output in the image in a correspondingly adapted and changed fashion when the steering angle changes and a bending angle α which results therefrom changes. In order to be able to perceive this change more quickly, the dynamic display elements 6, 7 can be output, for example, highlighted in terms of color. Alternatively or additionally they can be output enhanced graphically, for example with a relatively large line width, as illustrated. Furthermore, the outlines of the vehicle 1 and the static display element 4 which represents the central axis are displayed as the background.

LIST OF REFERENCE SYMBOLS

1 Vehicle or vehicle-trailer combination
2 Vehicle element
3 Vehicle element
4 Static display element
5 Flexible connection
6 Dynamic display element of the vehicle element 1
7 Dynamic display element of the vehicle element 2
A Display unit
D Evaluation unit
M1 First measuring unit
M2 Second measuring unit
P Center of rotation
α Bending angle

The invention claimed is:

1. A method for assisting a driver when maneuvering a vehicle or vehicle-trailer combination (1) which has a plurality of vehicle elements (2, 3) which can move with respect to one another, comprising:
   displaying the vehicle or vehicle-trailer combination (1) on a display unit (A) respectively using a dynamic display element (6, 7) which is assigned to the respective vehicle element (2, 3) and is determined as a function of an instantaneous or future position of the vehicle elements (2, 3) which can move with respect to one another, wherein the vehicle or vehicle-trailer combination (1) is displayed in a straight-ahead position on the display unit (A) using a static display element (4) which corresponds to the straight-ahead position of the vehicle elements (2, 3) and in addition respectively using the dynamic display element (6, 7) which is assigned to the respective vehicle element (2, 3), wherein the dynamic display element (6, 7) is displayed highlighted with respect to the static display element (4).

2. The method as claimed in claim 1, wherein the dynamic display element/elements (6, 7) for the instantaneous or future position of the vehicle elements (2, 3) which can move with respect to one another is/are adapted and correspondingly changed on the basis of a sensed instantaneous steering angle and/or a sensed instantaneous bending angle (α).

3. The method as claimed in claim 2, wherein the steering angle and/or the bending angle (α) are/is sensed continuously.

4. The method as claimed in claim 2, wherein the instantaneously sensed values of the steering angle and/or of the sensed bending angle (α) are/is fed to an evaluation unit (D).

5. The method as claimed in claim 1, wherein the dynamic display element/elements (6, 7) is/are displayed highlighted in terms of color and/or graphically with respect to the displayed static display element (4).

6. The method as claimed in claim 1, wherein the static display element (4) is output in accordance with the profile of the central axis of the vehicle (1).

7. The method as claimed in claim 1, wherein in the straight-ahead position of the vehicle elements (2, 3) the dynamic display element/elements (6, 7) is/are displayed in a way which corresponds to the profile of the central axis, and when vehicle elements (2, 3) are turned by a bending angle (α) with respect to one another the dynamic display element/elements (6, 7) is/are displayed swiveled about a rotational axis (P) which corresponds to the connection (5) between the vehicle elements (2, 3).

8. A device for carrying out the method as claimed in claim 1, wherein the vehicle or vehicle-trailer combination (1) can be displayed in the straight-ahead position by means of a display unit (A) using a static display element (4) which corresponds to the straight-ahead position and respectively using a dynamic display element (6, 7) which is assigned to the respective vehicle element (2, 3) and is determined as a function of an instantaneous or future position of the vehicle elements (2, 3) which can move with respect to one another, wherein the dynamic display element (6, 7) can be displayed highlighted with respect to the static display element (4).

9. The device as claimed in claim 8, wherein the dynamic display elements (6, 7) for the position of the vehicle elements (2, 3) which can move with respect to one another can be changed and displayed on the basis of a sensed instantaneous steering angle and/or of the bending angle ($\alpha$).

10. The device as claimed in claim 9, wherein a first measuring unit (M1) continuously senses the instantaneous steering angle of at least one steerable axle, and a further measuring unit (M2) continuously senses the instantaneous bending angle ($\alpha$) of at least the vehicle elements (2, 3) which can move with respect to one another.

11. The device as claimed in claim 10, wherein the first measuring unit (M1) for sensing the steering angle and/or the second measuring unit (M2) for sensing the bending angle ($\alpha$) are/is embodied as a position sensor, in particular angle sensor in the form of magneto-resistive or Hall sensors.

12. The device as claimed in claim 8, wherein the instantaneously sensed values of the steering angle and/or of the bending angle ($\alpha$) can be fed to an evaluation unit (D).

* * * * *